US006975858B2

(12) United States Patent
Cao et al.

(10) Patent No.: US 6,975,858 B2
(45) Date of Patent: Dec. 13, 2005

(54) METHOD AND APPARATUS FOR REDUCING SIGNALLING LOAD IN MOBILE TELECOMMUNICATIONS NETWORKS

(75) Inventors: Qiang Cao, Swindon (GB); Patrick Georges Venceslas Charriere, Tetbury (GB); Fang-Chen Cheng, Randolph, NJ (US); Said Tatesh, Swindon (GB); Gordon Peter Young, Bracknell (GB)

(73) Assignee: Lucent Technologies Inc., Murray Hill, NJ (US)

(*) Notice: Subject to any disclaimer, the term of this patent is extended or adjusted under 35 U.S.C. 154(b) by 559 days.

(21) Appl. No.: 10/020,330

(22) Filed: Dec. 12, 2001

(65) Prior Publication Data
US 2002/0094819 A1    Jul. 18, 2002

(30) Foreign Application Priority Data
Dec. 20, 2000  (EP) ................................. 00311465

(51) Int. Cl.⁷ ............................................. H04M 3/00
(52) U.S. Cl. ..................... 455/420; 455/418; 455/419; 455/450; 455/422
(58) Field of Search ............................... 455/420, 418, 455/419, 450, 422

(56) References Cited

U.S. PATENT DOCUMENTS 5,091,942 A  *  2/1992  Dent .......................... 380/46
6,185,196 B1 *  2/2001  Mademann ................ 370/327
6,731,937 B1 *  5/2004  Spinner ..................... 455/445

FOREIGN PATENT DOCUMENTS

| DE | 199 09 921 A1 | 9/2000 | ........... H04L 29/02 |
| EP | 0 642 283 A2 | 3/1995 | ........... H04Q 7/22 |
| EP | 0 789 500 A2 | 8/1997 | ........... H04Q 7/32 |

* cited by examiner

*Primary Examiner*—Lee Nguyen
*Assistant Examiner*—Minh D. Dao

(57) ABSTRACT

In the UMTS, semi-static uplink and downlink connection parameters relating to the frequently-used services of voice, fax and web browsing are intermittently broadcast to mobile user equipment (20) which stores the parameters. When a mobile requests (30) one of those services, the relevant dynamic parameters are sent (32) over the radio interface and the mobile is asked whether it has in its store the relevant parameters for the requested service; if so (34), the call is set up; if not (36), the semi-static parameters relevant to the requested service are sent (38) to the user equipment. Considerable saving of radio resource results.

9 Claims, 3 Drawing Sheets

METHOD AND APPARATUS FOR REDUCING SIGNALLING LOAD IN MOBILE TELECOMMUNICATIONS NETWORKS

CROSS REFERENCE TO RELATED APPLICATION

This application claims priority of European Application No. 00311465.9 filed on Dec. 20, 2000.

BACKGROUND OF THE INVENTION

1. Field of the Invention

This invention relates to a method and apparatus for reducing the signaling load in mobile telecommunications networks, especially for reducing the signaling load to a mobile terminal over the radio interface.

2. Description of the Related Art

In the current Universal Mobile Telephone System (UMTS), for each radio connection between a mobile and the network, it is necessary to specify a large number of parameters, such as the parameters relating to channel coding, to the physical layer, to radio bearers, and to the physical transport and logical channels for the connection, for both the uplink and the downlink. As many as two hundred parameters may need to be specified, which allows a very high level of flexibility to suit the needs of individual users. At present, the set up of each radio link is modular and the full set of parameters is sent by the network to the mobile for layers 1 to 3.

The arrangement is shown in FIG. 1 in which several items of User Equipment UE1 to UEn, indicated at 10(1) to 10(n), are radio-linked to Node B, reference 12. The Node B 12 is one of several Node Bs controlled by a Radio Network Controller (RNC) 14 which is connected to the Core Network (CN) 16. The Node B 12 and the RNC 14 together form the UMTS Terrestrial Radio Access Network (UTRAN).

On set-up of each UE 10, the Node B12 sends an individual Radio Resource Control (RRC) message, indicated by the arrows A(1) . . . A (n) to that UE. The RRC message may, for example, be the "RB Set Up" message defined in 3GPPStandard.

A disadvantage of the current arrangement is that radio resource is wasted as the UTRAN sends the set-up message over the air interface each time a mobile connects to the network.

SUMMARY OF THE INVENTION

It is the object of the invention to provide an improved method of connection of mobile equipment which is less wasteful of radio resources.

According to the invention, in a mobile telecommunications network comprising a core network and a plurality of control elements each connectable by radio transmission to a plurality of mobile user equipments, a method of communicating to each user equipment a multiplicity of signaling-related parameters characterized by:

grouping the parameters into a first, semi-static group and a second, dynamic group; storing the first group of parameters in the user equipment;

when a signaling requirement is to be transmitted over the radio interface, sending to the user equipment the parameters in the second group and inquiring whether the user equipment has stored within it the parameters in the first group relating to that signaling requirement;

and, if so, implementing the signaling requirement.

Also according to the invention, a control element for a mobile telecommunications network which is connectable by radio transmission to a plurality of mobile user equipments characterized in that, when a user equipment requests a frequently-used service, the control element is arranged to send to the user equipment over the radio interface dynamic signaling-related parameters related to the requested service, and to request the user equipment to indicate if it has stored within it, the semi-static signaling-related parameters related to the requested service; and, if a positive indication is received from the user equipment, to complete call set-up. The control element may be a Node B.

Further according to the invention, a mobile user equipment for a telecommunications network, the user equipment being connectable by radio transmission to a control element in the network characterized in that the equipment is arranged to store within it a group of semi-static signaling-related parameters.

BRIEF DESCRIPTION OF THE DRAWINGS

In the drawings, the prior art is illustrated in FIG. 1. The invention will be described by way of example only with references to FIGS. 2 to 4 in which.

DETAILED DESCRIPTION

Figure 1:
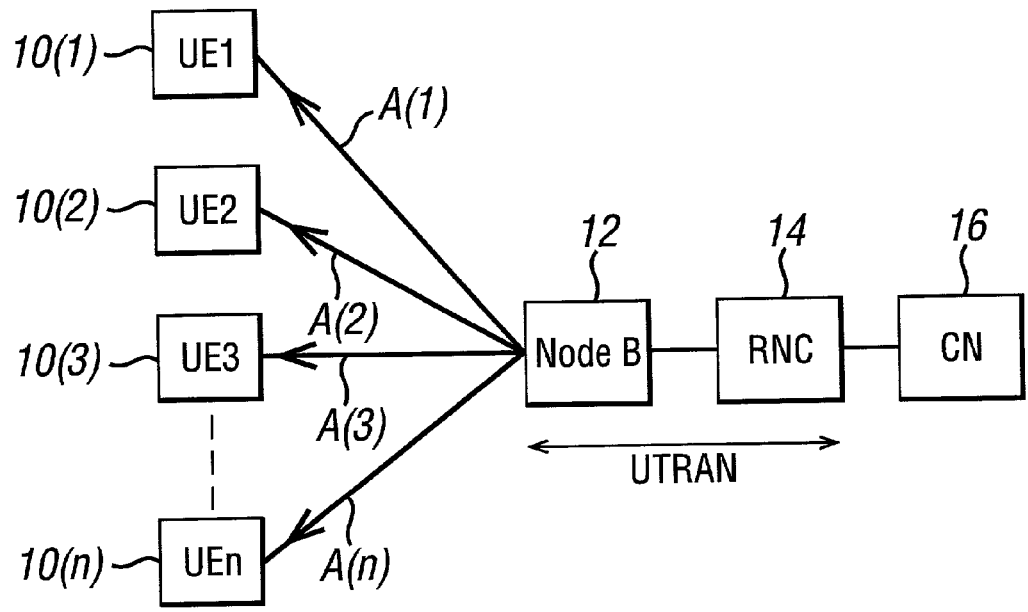
Figure 2:
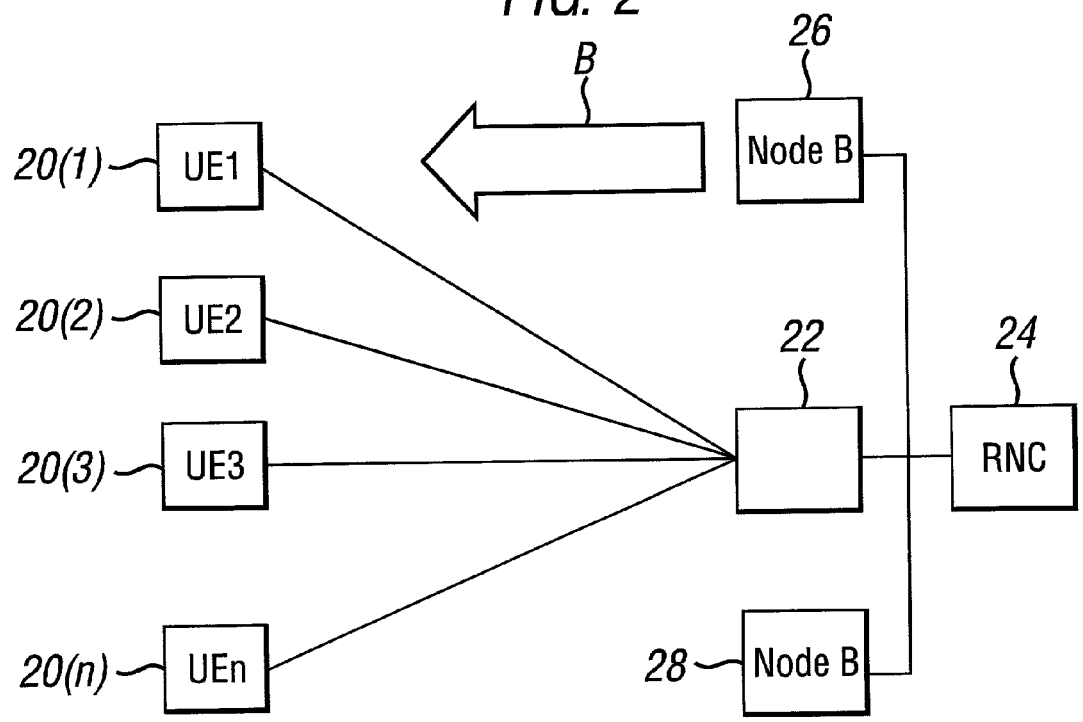
FIG. 2 illustrates a method of communicating parameters in the first group to mobile equipment.

In FIG. 2, several items of user equipment 20 (1) to 20 (n) are controlled by a Node B 22. The Node B is controlled by a RNC 24, which also controls two other Node Bs 26, 28.

The Node Bs 22, 26, 28 are instructed by RNC 24 to broadcast the semi-static parameters in the first group, as indicated by the arrow B. The semi-static parameters are broadcast in the standard broadcast channel and are broadcast intermittently, each broadcast period being sufficiently long for any UE 20 associated with one of the Node Bs to receive the parameters during that mobile's intermittent log-on to the broadcast channel which is a standard procedure.

On receipt of the broadcast, each UE 20 stores the semi-static parameters, for example in its SIM card.

As an alternative, static parameters can be initially loaded into the SIM card by the manufacturer, but such an arrangement gives less flexibility than intermittent broadcast which allows updating at intervals of the semi-static parameters.

The semi-static parameters are grouped on the basis that the vast majority of users of mobile equipment use only a limited set of services, such as voice services, fax services and web browsing. For such services, about eighty per cent of the parameters for the setting of layers 1, 2 and 3 of the network are predefined and form the semi-static parameters of the first group. The remaining twenty per cent, such as frequency channelisation and scrambling codes, are dynamically managed by the radio network and form the second, dynamic group of parameters.

On call set-up, if the first group of parameters is stored in the user equipment, only the second group needs to be sent over the radio interface, with great savings of radio resource.

In more detail, the parameters in the first group relating to the most popular services can be defined by the network operator, conveniently identified by a "Profile Identifier" value relating to a predefined setting number N for each service and, to allow updating when necessary, also by a "Profile Version" value V.

Figure 3:
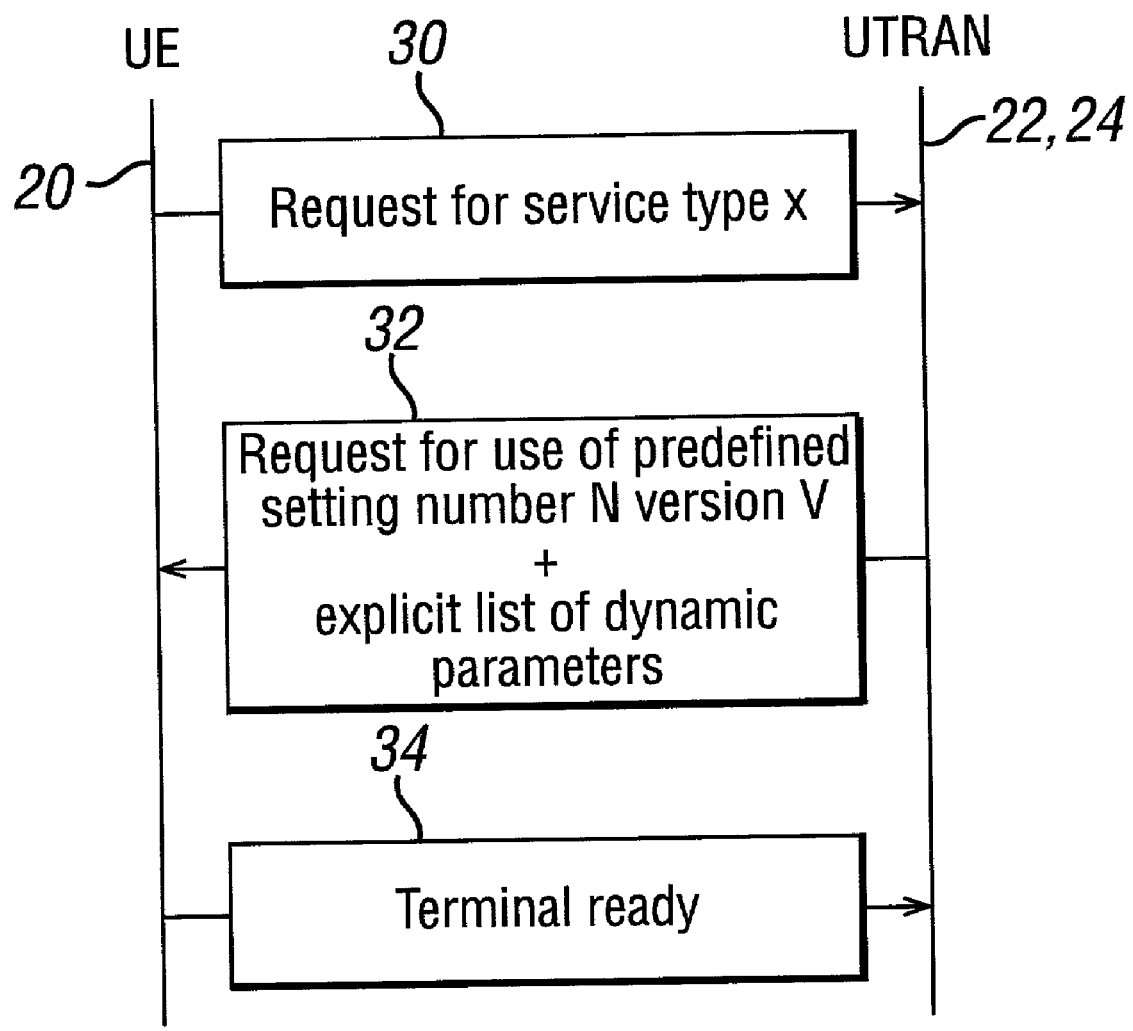
FIG. 3 illustrates call set-up when mobile equipment has already stored parameters in the first group.

A first call set-up procedure is shown in FIG. 3. The UE 20 sends to the UTRAN 22, 24 a request 30 for service type x; the UTRAN 22, 24 responds by sending an explicit list of dynamic, second group, parameters, and also a request for use of one of the predefined setting numbers N for the requested service, plus the version value V, reference 32.

If the UE 20 already has stored within it the parameters corresponding to N and V, it sends a "terminal ready" message 34 and the call is set up and can proceed.

Figure 4:
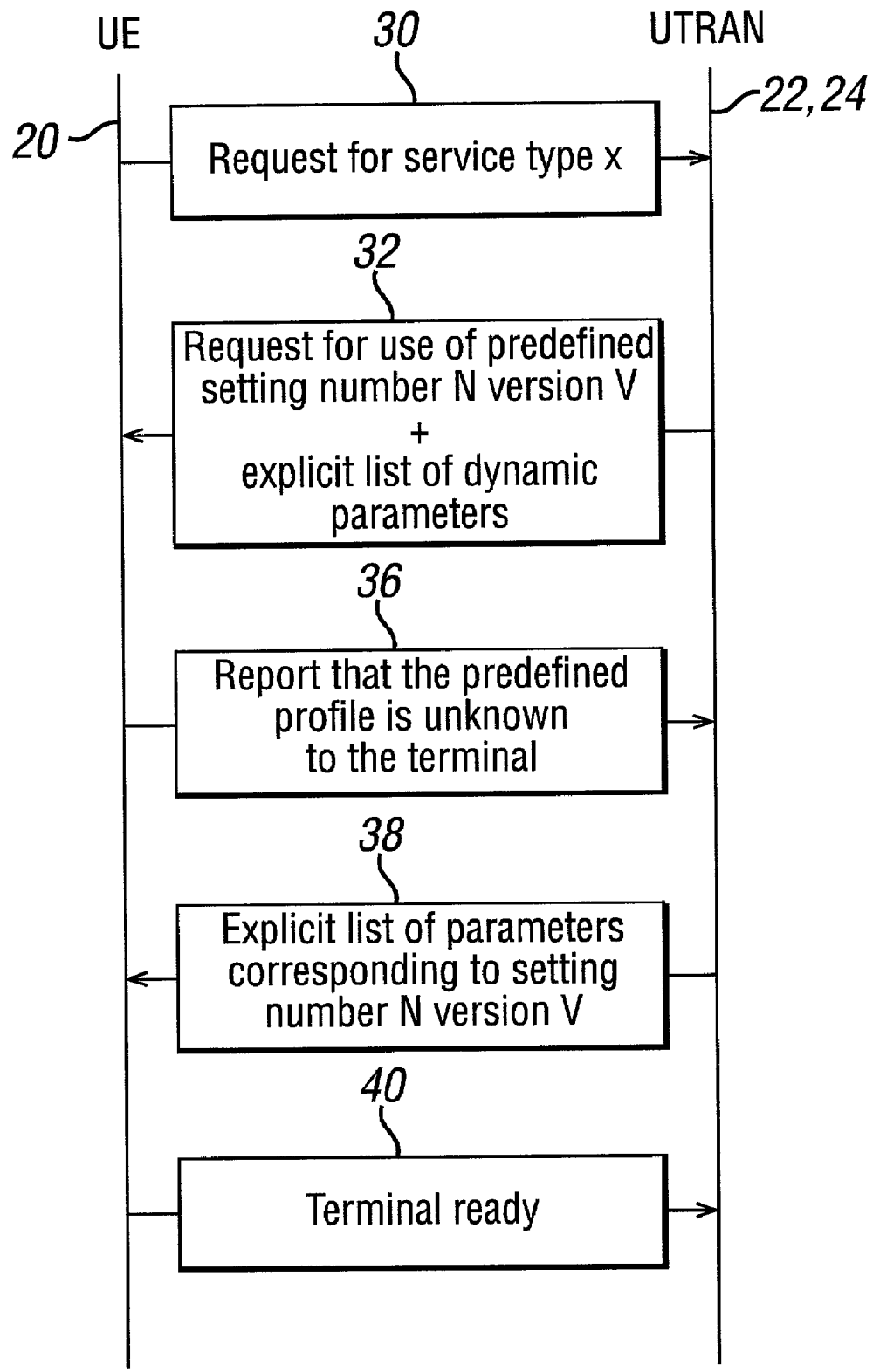
FIG. 4 illustrates call set-up when the parameters in the first group are unknown to the mobile equipment.

In FIG. 4, the request for service 30 and response with dynamic parameters and N and V, 32, are sent as in FIG. 3. This time the UE 20 does not have the predefined profile stored and reports this to the UTRAN, reference 36. The UTRAN 22, 24 then sends an explicit list of parameters corresponding to setting number N version V, 38, and the UE 20 then sends a "terminal ready" message 40.

The message exchange illustrated in FIG. 4 occurs either when the UE 20 has not received a broadcast version of the first group parameters, or when the recorded version V for the required service is out of date. Whichever applies, the UE 20 now stores the profile number N version V for future use.

It is also possible to set an expiry timer for the validity of any one of the first group's settings N or for a version V.

Application of the invention not only saves radio resource, but also reduces call set-up time.

In another example, the invention can be applied to compressed mode patterns, i.e. when the network requires a terminal to go into compressed mode, when long lists of often-repeated characters are sent by the network to a UE. The often-repeated characters, ie the semi-static parameters, are broadcast to the user equipment and stored and also the number of repetitions; when the network requires operation in compressed mode, the UTRAN asks the relevant UE whether it has stored the often-repeated characters and, if a positive reply is received, compressed mode can be quickly set up. Compressed mode is defined in the UMTS standard.

In this example, the semi-static parameters will include the Transmission Gap Pattern Sequence I (TGPSI); the TGPS Status Flag; the transmission gap pattern sequence configuration parameters; the Transmission Gap pattern sequence Measurement Purpose (TGMP); the Transmission Gap Pattern Repetition sequence (TGPRC); and the Transmission Gap Starting Slot Number (TGSN). A dynamic parameter will be the Connection Frame Number of the Transmission Gap Pattern Sequence (TGCFN).

Again, considerably less radio resource is required, and set-up time for compression mode can be reduced.

While initially the invention will be utilized in the UMTS, it is also expected to be used in future generations of mobile telecommunications networks.

What is claimed is:

1. In a mobile telecommunications network comprising a core network and a plurality of control elements, each control element being connectable by radio transmission with a plurality of mobile user equipments, a method of communicating to each user equipment a multiplicity of signaling-related parameters comprising:

grouping the parameters into a first, semi-static group and a second, dynamic group;

storing the first group of parameters in the user equipment;

when a signaling requirement is to be transmitted over the radio interface, sending to the user equipment the parameters in the second group and inquiring whether the user equipment has stored within it the parameters in the first group relating to that signaling requirement; and, if so, implementing the signaling requirement.

2. A method according to claim 1 in which the first, semi-static group of parameters relate to uplink and downlink connection parameters for the services most-frequently used by user equipment.

3. A method according to claim 2 in which the first, semi-static group of parameters are further divided into profile identifier groups, each identifying a predefined setting number N for each most frequently used service and a version V of that setting number.

4. A method according to claim 3 in which, when a user equipment requests one of the most frequently used services, the network requests the user equipment to use a predefined setting number N and a version V and, if the user equipment has that version V stored, the user equipment returns a "terminal ready" message.

5. A method according to claim 3 in which, when a user equipment request one of the most frequently-used services, the network requests the user equipment to use a predefined setting number N and a version V and, if the user equipment does not have that version V stored, the network sends to that user equipment the parameters of the predefined setting number N and version V, which the user equipment stores.

6. A method according to claim 5 in which the terminal stores those parameters related to version v of setting number N.

7. A method according to claim 1 in which the first, semi-static group of parameters relate to compressed mode operation of user equipment.

8. A method according to claim 1 in which the first group of parameters is intermittently broadcast to user equipment on the broadcast channel of the network.

9. A control element for a mobile telecommunications network which is connectable by radio transmission with a plurality of mobile user equipments, comprising, when a user equipment requests a frequently-used service, the control element is arranged to send to the user equipment over the radio interface dynamic signaling-related parameters related to the requested service, and to request the user equipment to indicate if it has stored within it, the semi-static signalling-related parameters related to the requested service; and, if a positive indication is received from the user equipment, to complete call set-up.

* * * * *